SEMICONDUCTOR BALLAST CIRCUIT FOR GAS DISCHARGE LAMPS

INVENTOR
EDWARD MAHLER
BY Nolte & Nolte
ATTORNEYS

INVENTOR
EDWARD MAHLER
BY Nolte & Nolte
ATTORNEYS

INVENTOR
EDWARD MAHLER
BY Nolte & Nolte
ATTORNEYS

SEMICONDUCTOR BALLAST CIRCUIT FOR GAS DISCHARGE LAMPS

Filed Dec. 15, 1967 4 Sheets-Sheet 4

INVENTOR
EDWARD MAHLER
BY Nolte & Nolte
ATTORNEYS 3,486,069

SEMICONDUCTOR BALLAST CIRCUIT FOR GAS DISCHARGE LAMPS

Edward Mahler, Long Island City, N.Y., assignor to Holophane Company, Inc., New York, N.Y., a corporation of Delaware Filed Dec. 15, 1967, Ser. No. 690,947
Int. Cl. G05f *1/00;* H05b *37/02*
U.S. Cl. 315—194 2 Claims

ABSTRACT OF THE DISCLOSURE

A switch having a firing electrode is connected between a source of full wave rectified voltage and a load. A trigger circuit connected across the voltage source and to the firing electrode of the switch controls the conductive condition of the switch. A current sensor connector to the trigger circuit and coupled to the load senses the current through the load switches the switch to its conductive condition via the trigger upon sensing determined magnitudes of current in the load. A current variation limiter coupled to one terminal of the load and connected between the other terminal of the load and the current sensor, limits the current temporarily at a determined time and monitors the voltage across the load. The limiter transfers current control of the load to the switch via the current sensor and trigger at a determined time so that a constant current is supplied to the load via the switch regardless of variations in magnitude and frequency of the voltage of the voltage source and regardless of the opearting condition of the load. The trigger fires the switch earlier in each cycle when the current in the load decreases and later in each cycle when the current in the load increases.

DESCRIPTION OF THE INVENTION

Figure 1:
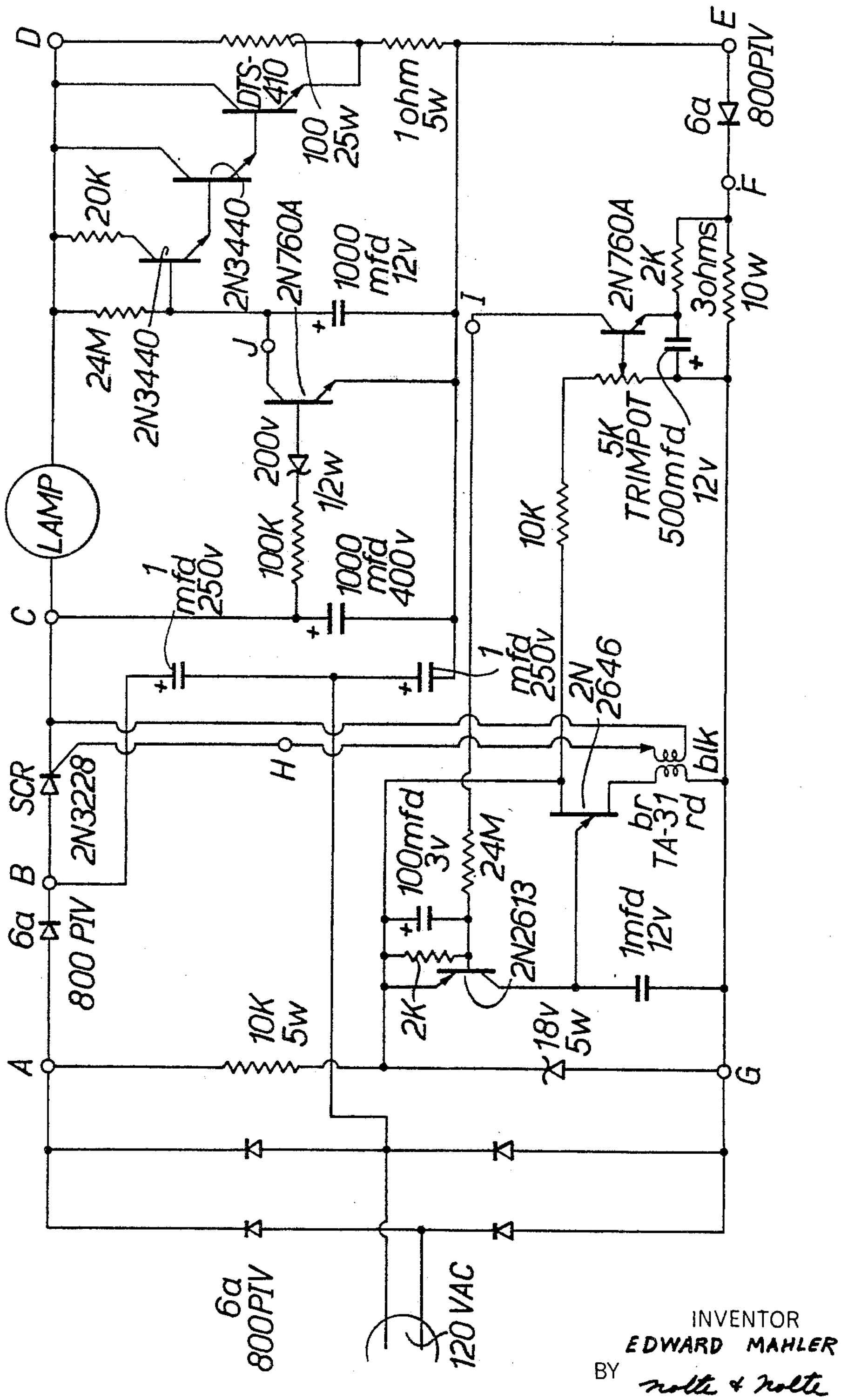
Figure 2:
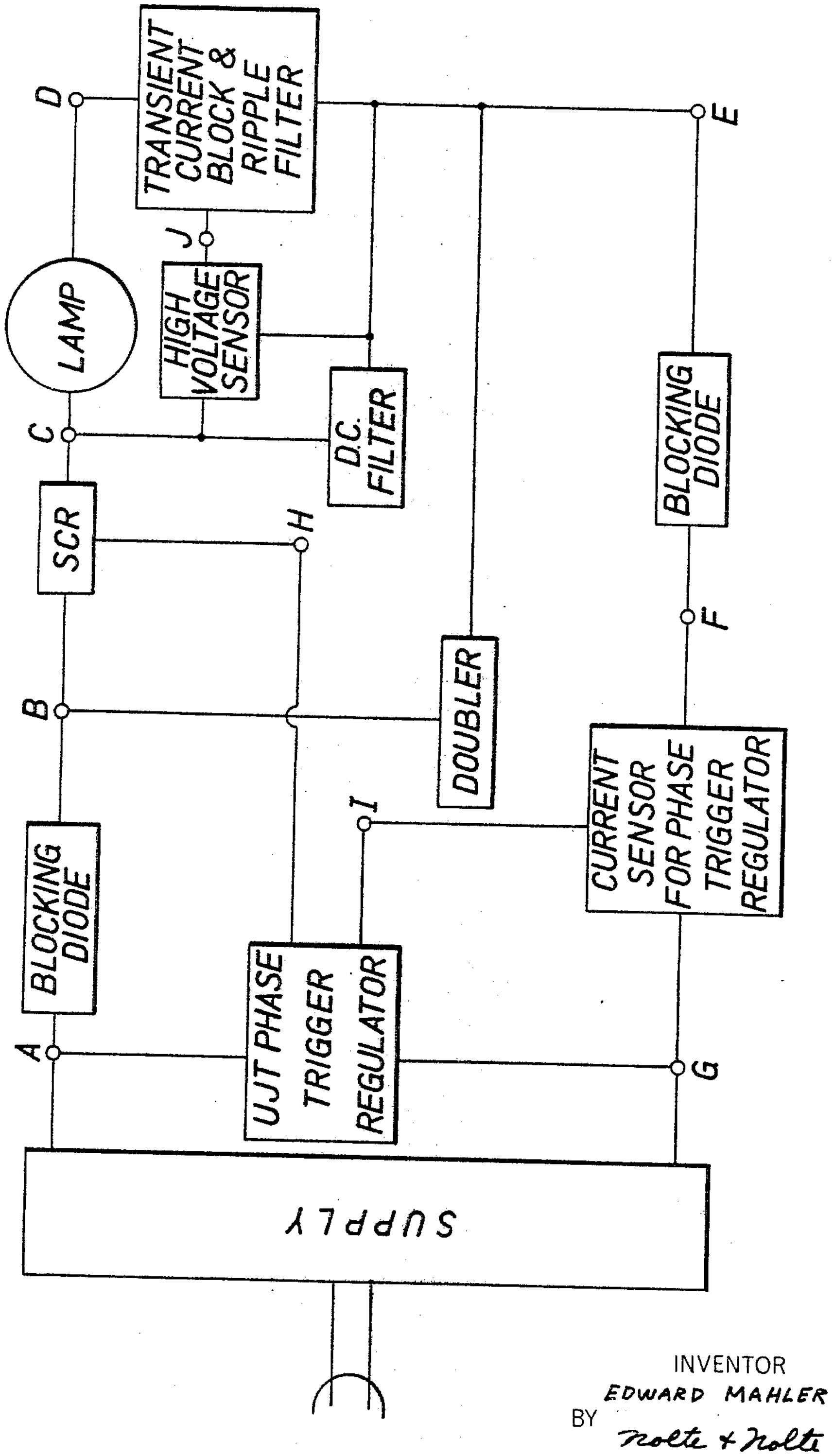
Figure 3:
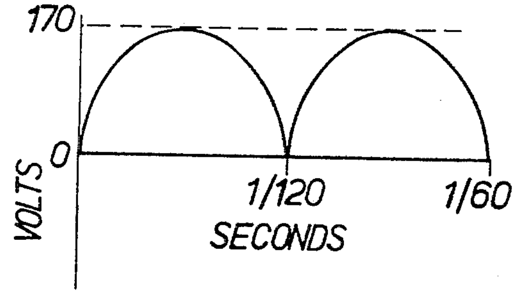
Figure 4:
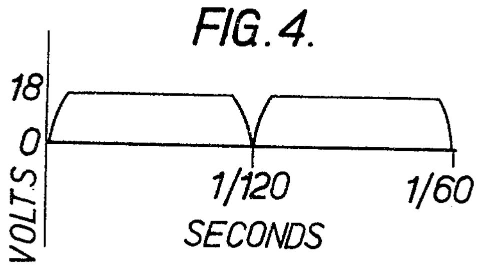
Figure 5:
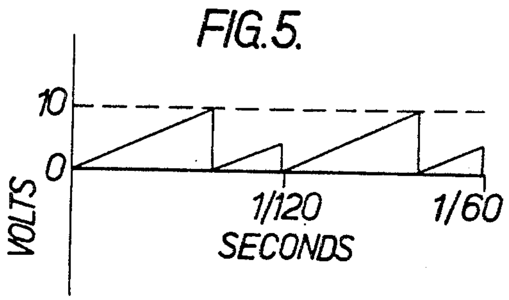
Figure 6:
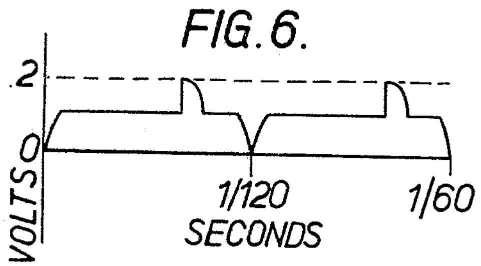
Figure 7:
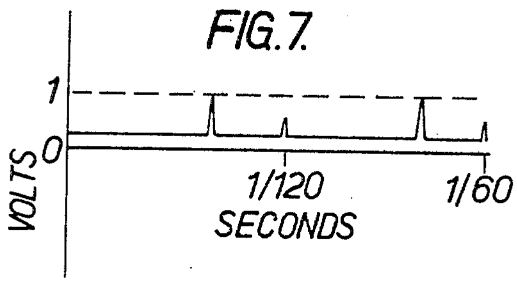
Figure 8:
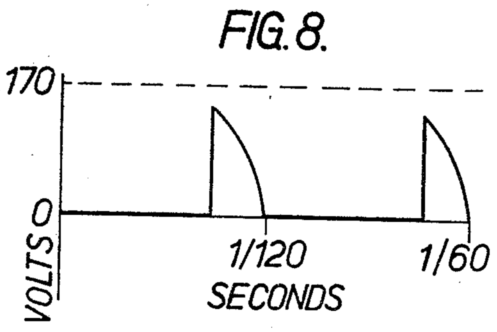
Figures 9, 10:
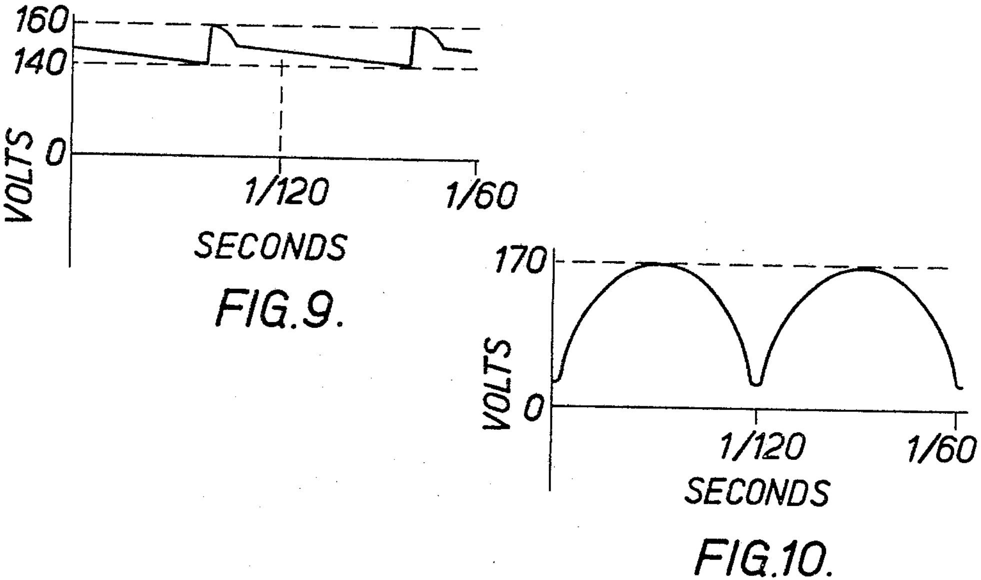
Figure 11:
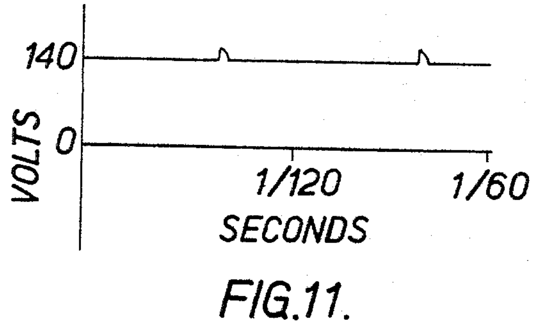
Figure 12:
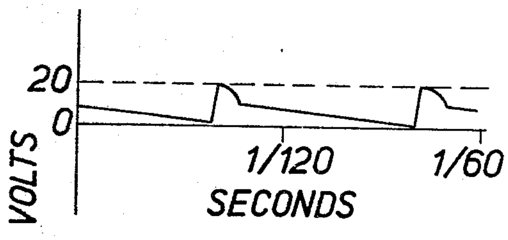

The present invention relates to a semi-conductor ballast circuit for gas discharge lamps. More particularly, the invention relates to a transistorized and semiconductor rectifier ballast circuit for mercury vapor discharge lamps and the like. The circuit of the present invention may be utilized as a current or voltage regulating circuit.

I. PURPOSE AND APPLICABILITY

The solid state ballast described in this paper has been designed with the following intentions: To provide (A) A more economical means for operating mercury vapor and other gas discharge light sources from the standpoint of:

(1) Cost of manufacture
(2) Cost of power to operate
(3) Installation requirements due to decreased size and weight
(4) Lower heat output developed in ballast (B) A more versatile lamp control device in terms of:

(1) Input voltage flexibility
(2) Variety of lamps operable
(3) Output regulation

II. ADVANTAGES OVER PRIOR ART

A. Input voltage flexibility

The iron ballast must be designed specifically for each input voltage. Lamp output varies radically for input voltage variations greater than ± 10%. The solid state ballast, depending upon component selection, will provide unvarying lamp output over a voltage range of 400% or more, depending on the input voltage of the system. If the system voltage is dropped below 110 the lamp will drop somewhat in output. Depending upon the upper limits of components chosen for the unit, the input voltage may be raised to the maximum encountered in industrial lighting installations without adding appreciably to the cost of the ballast. As a result (1) The ballast out-performs any iron ballast on the market in terms of output regulation in all but the 120 volt system. The 120 volt version allows only 10% voltage drop before the lamp extinguishes. All other input voltages can be varied to the extreme ends of the range, from 110 to 480 or more, with little or no change in lamp output.

(2) The ballast may be manufactured and sold as an all voltage unit since it may be plugged into any supply voltage with no change in lamp operation.

B. Lamp wattage flexibility

Depending on choice of components a single solid state ballast may be designed to operate a wide range of lamp wattages. To switch from one lamp to another the unit is calibrated by adjusting the appropriate potentiometer.

C. Low weight

The solid state ballast weights less than ⅕ the comparable constant wattage model.

D. Construction flexibility

The solid state ballast consist of a non-critically placed set of small electronic components. Iron ballasts have a configuration requirement which makes them extremely bulky and difficult to integrate within luminaire construction. Thus, the new ballast is much more adaptable to fixture design.

E. Power factor

Iron ballasts exhibit current lag characteristics, depending on the magnitude of their power factor. Industrial machinery generally exhibits the same lag characteristic, thus decreasing the resultant power factor of the entire installation. The solid state ballast exhibits a leading current wave form, thus tending to correct the already lagging installation and bring it up to 1.

III. DESCRIPTION OF THE CIRCUIT

A. Lamp characteristics

The mercury lamp operates in three stages.

(1) Strike

If one were to measure the resistance across the terminals of the lamp base one would find its resistance to be infinite. To begin lamp operation 250 to 300 volts must be applied in order to ionize the argon starting gas. When this ionization has taken place lamp resistance drops almost instantaneously to a very low figure. Without current limiting circuitry either the power supply would destroy itself, or the sudden intense internal heating of the current carrying gas in the arc tube would result in sufficient pressure to burst the tube.

(2) Warmup

After lamp strike, with proper current limiting, the argon starting gas heats the mercury droplets in the arc tube into evaporation. As the mercury vapor enters the arc, lamp impedance rises. Prior current control circuitry maintains constant current by increasing lamp voltage.

(3) Steady state operation

Upon complete evaporation of the mercury in the arc tube the lamp reaches its steady state operating condition.

Small variations in current after this point result in large variations in light output. Current reduction by 10% or more results in extinguishing the lamp. Over current results in shortened lamp life or sufficient arc pressure to break the tube.

(4) Negative resistance

The lamp differs from a simple resistive load by this important characteristic. A sudden increase or decrease in lamp voltage does not result in a proportional increase or decrease in lamp current as Ohm's law would predict for a resistive load. Sudden increases in current produce corresponding decreases in lamp resistance and, therefore, still greater increases in current. The result is current runaway unless an effective current limiting circuit is operating the lamp. Such an effect, if not compensated for, can ruin the lamp and/or the supply. The same effect occurs in the opposite direction for current drops, but the only damage that can occur in this case is lamp extinguishing. A fast acting current control circuit can effectively prevent negative resistance from being a problem of lamp operation.

As a result of this negative resistance characteristic the mercury lamp cannot simply be operated directly from the AC line. The 60 cycle AC waveform spends so much time in the low voltage region that the lamp extinguishes. There are four techniques for dealing with this negative resistance problem causing lamp extinguishing.

(a) Restriking technique

This is the method employed by the presently used iron ballast. At the end of each cycle the lamp does extinguish, but the inductive kick, created by the quick collapse of the arc, provides sufficient voltage for restrike. The apparent result is a continuous operation lamp.

(b) D.C. technique

This method operates the lamp in the D.C. mode, that is, with steady voltage and current. As a result, no sudden drops or rises in current take place. Thus, the opportunity for negative resistance characteristics to operate is eliminated.

(c) High frequency pulse technique

By delivering D.C. square pulses at high frequency this technique limits the effective lamp voltage and current by controlling the time ratio between on and off periods of the cycle.

At a few hundred c.p.s. the negative resistance characteristic is unaffected by such fast current changes.

(d) A.C. square wave technique

This method can be thought of as the D.C. technique employing a square wave output for the lamp. Fast rise and fall times of a square wave would incorporate the advantages of superior current regulation afforded by the D.C. method with the polarity reversal advantage of A.C. operation for longer electrode life, eliminating the need for restrike in the A.C. mode.

B. The circuit

The circuit described in this paper employs the D.C. mode of lamp operation. Modifications may be made at a future time to convert the D.C. output of this circuit to an A.C. square wave. To facilitate description of the circuit operation two diagrams are shown, FIGURES I and II. FIGURE I is the schematic diagram and FIGURE II the block diagram. Corresponding points are labeled on both drawings to simplify the locating of circuit systems as they are discussed. Additional diagrams are included in order to describe the wave forms produced or acted upon by these systems.

Application of 120 volt 60 cycle A.C. at the plug produces full wave rectification between points A and G on FIGURES I and II as shown in FIGURE III. Because of the initial high impedance of the mercury lamp the two one microfarad 250 volt capacitors of the Voltage Doubler circuit build up sufficient potential to cause the mercury lamp to strike. Because of the lack of current flow in the pre-strike period, the current sensing circuitry allows the SCR to be full "on." Thus, the high voltage produced by the Doubler circuit appears across terminals, C and E. Since no current flows prior to strike the potential at D is nearly equal to that at E and, therefore, the strike potential also appears across the lamp terminals. Since the 1000 microfarad 400 volt D.C. Filter is fully charged to the strike potential at the strike moment, and the impedance of the lamp drops from almost infinite to almost negligible, some means must be employed to prevent its instant discharge when the lamp begins to conduct. If this is not done the sudden current surge, reinforced by the negative resistance characteristic of the lamp, discharges the D.C. Filter capacitor so rapidly that the lamp extinguishes before more current from the supply can get to it.

The Transient Current Block and Ripple Filter, immediately following lamp strike, acts as a temporary current limiter preventing this rapid discharge and lamp "flashout." This is accomplished by insuring that the three transistors which comprise the Transient Current Block are locked off during and immediately following the strike. Thus, current passing through the lamp at this time must pass through the 100 ohm shunt resistor across the DTS-410 transistor. The off condition of the three transistors comprising the Transient Current Block at strike time is guaranteed by the operation of the adjacent High Voltage Sensor circuit. This circuit monitors the voltage between points C and E. When the voltage between these points is greater than 200 volts, the 2N760A transistor is turned on shorting the 1000 microfarad capacitor in the Transient Current Block circuit and locking the three transistors off. After lamp strike voltage across the Sensor drops well below 200 volts, the 2N760A turns off and the 1000 microfarad capacitor slowly charges. As the charge on this capacitor builds the impedance of the three transistors drops and they conduct. Thus, the task of current control is transferred, after the lamp strike, from the Transient Current Block and High Voltage Sensor circuits to the more versatile and efficient SCR control circuitry.

The SCR control circuitry is designed to maintain a constant current through the lamp regardless of what stage of operation the lamp is in, warup or steady state, regardless of what input voltage is applied to the supply, and regardless of what frequency the input voltage is. Current which passes through the lamp also passes through the Current Sensor for Phase Trigger Regulation. By means of the 5K trimmer in this circuit the Current Sensor has been preadjusted to insure the current flow for the particular lamp in use. Slight rises above this level cause the 2N760A of this circuit to conduct less, decreases in current cause increases in its conduction. These conduction changes in the Current Sensor control the conductivity of the 2N2613 in the UJT Phase Trigger Regulator. Thus, too high a lamp current results in high impedance in the 2N2613 low current low impedance. This impedance change determines the charging rate of the .1 microfarad capacitor. Slow charging results in later triggering of the UJT (2N2646 unijunction transistor). When the UJT is triggered the SCR is also triggered. The voltage level at which the SCR triggers and passes current is dependent on the timing of the trigger.

As can be seen from the wave form in FIGURE III later triggering results in current passing through the SCR at lower voltage. Thus, reductions in lamp current cause earlier SCR trigger in each cycle, overcurrent causes later triggering. At the zero voltage point of each cycle the minimum holding current of the SCR is passed and the SCR waits in the off condition for the trigger pulse of the next cycle.

To insure proper timing of the SCR trigger pulse the .1 microfarad capacitor must begin charging at some reference point on the wave cycle, FIGURE III. It is convenient to use the zero voltage point due to the nature of the UJT trigger. When the potential between the bases of the UJT drops to zero triggering automatically takes place, regardless of the stage of capacitor charge. Thus, at the beginning of each cycle the .1 microfarad capacitor is beginning its charging process. During the charging process the UJT and 2N2613 must be operated by a constant voltage DC source. This is accomplished by the use of the 18 volt Zener diode between the 10K resistor and G. The wave form from A to G is shown in FIGURE III; the wave form across the Zener is shown in FIGURE IV. Thus, the UJT Phase Trigger Regulator circuit is powered by 18 volts D.C. during the cycle and zero volts at the beginning and end. The UJT generally triggers at some time after half the cycle is over, and the discharged capacitor begins to recharge. Before it reaches the trigger level a second time the cycle ends and discharge takes place, readying the capacitor for the next cycle. The wave form across the .1 microfarad capacitor, between the UJT emitter and G is shown in FIGURE V. The output of the UJT appears across the primary of the TA–31 pulse transformer as shown in FIGURE VI. The transformer then pulses the SCR gate with the triggering spike shown in FIGURE VII. Without the 1000 microfarad D.C. Filter the wave form produced by this manner of SCR operation between points C and E would be as shown in FIGURE VIII. Addition of the D.C. Filter results in a flattening of this wave, FIGURE IX. Further flattening of this wave form is necessary to reduce possible negative resistance runaway. This will be discussed.

As described above, the UJT Phase Trigger Regulator uses the zero voltage point of each cycle as a zero time reference point, FIGURES III and IV. Therefore, the integrity of this wave form is quite important.

If the zero voltage level is not reached each cycle the .1 microfarad capacitor triggers the UJT at random times and current regulation is lost. The .1 microfarad capacitors of the Doubler, due to their residual charge at the end of each cycle, tend to feed current back in the direction of the Supply and UJT Phase Trigger Regulator. The two Blocking Diodes prevent this. Without them the A to G voltage would look like FIGURE X.

Because of the negative resistance characteristic of the lamp it is important that a fast acting control circuit be used to prevent current runaway. One of the main advantages of this ballast circuit is its high efficiency. It extracts power from the line at exactly the voltage necessary to operate the lamp, thereby incurring minimum resistive heating and power loss. However, the current control circuit which picks the voltage required at each stage of operation is not very fast. It requires at least one cycle of operation to pick the trigger point of the next. Negative resistance current takeoff can occur in a single cycle. The Transient Current Block and Ripple Filter performs the function of a fast acting current change limiter. This is accomplished by the use of a high gain D.C. amplifier (2–2N3440's and a DTS–410) comparing the difference between the potential across the 1 ohm 5 watt resistor and the 1000 microfarad capacitor. The result is a smoothing effect on lamp current from the wave form shown in FIGURE IX to that shown in FIGURE XI, an effective reduction in A.C. ripple from 11% to 2.5%. In effect the Ripple Filter acts as an inductor. Its effectiveness is determined by the R and C of the .24M resistor and the 1000 microfarad capacitor. Raising their values causes more effective filtering at an increase in power loss. Power loss occurs as the DTS–410 resistance increases in each cycle to compensate for the tendency toward current increase. The voltage across the DTS–410 is shown in FIGURE XII. This wave form added to that of FIGURE XII equals the wave form in FIGURE IX. Thus, the Transient Current Block and Ripple Filter performs two functions, first in conjunction with the High Voltage Sensor for lamp striking and second as a ripple filter.

C. Epilogue

For the purpose of description the ballast operation has been shown with a supply of 120 volt 60 cycle A.C. With this circuit the input voltage must be 120 volts only at the moment of strike. During warmup and steady state running the input voltage may be raised to any level up to 480 volts without appreciably affecting lamp current. All the wave forms shown remain the same with the exception of FIGURE III whose peaks rise with higher voltage. Also, raising the voltage at any stage of lamp operation advances the trigger point of the SCR.

This circuit is recognized by the author to be an important step toward a fully competitive solid state ballast for mercury lamp operation. It has great potential in terms of input voltage requirements and lamp wattage. The unit described in this paper has operated the 75, 100, 175, and 250 watt lamps without component change.

Slight modifications in circuitry will enable the solid state ballast to strike as well as operate at voltages above 120. Increasing the current handling ability of the main line components between points A thru G increases the wattage handling ability of the unit to 400 and 1000 watts. Except for the D.C. Filter, components other than main line require no alteration. In addition to voltage and wattage flexibility this circuit also is relatively insensitive to line frequency variation. A drop to 50 cycles would have little or no affect. Increases above 60 cycles would affect the unit even less. Although no test facilities were available for verification, radical drops in frequency should require proportional increases in D.C. Filter capacitance, increased frequency should allow decreased capacitance but not require it.

In addition to a modification providing for lamp striking at other inputs than 120 volts, alterations may be made in the circuit to provide the lamp with a square wave instead of D.C. Tests have shown that lamp life suffers from D.C. operation. A polarity reversing latching relay, which reverses current flow each time the unit is turned on, may eliminate this life loss. If not, a square wave may be created from the ballast output to drive the lamp. Experimentation may determine if a particular frequency of square wave results in better life or lumen maintenance than others.

IV. Possible variations

A. As a current regulated D.C. supply.

Since a D.C. supply is designed to operate resistive loads a great many problems do not have to be dealt with that require attention for mercury lamp operation.

Removal of the Doubler, the Blocking Diodes, and the High Voltage Sensor results in a highly efficient, high current, low ripple, current regulated supply which will operate from any input voltage, even one that varies.

B. As a voltage regulated D.C. supply.

The same trigger point regulation principle may be employed with a modification in circuitry to make the unit voltage regulating instead of current. The same input flexibility would hold for this constant voltage supply as for the constant current version.

What is claimed is:

1. A current regulating circuit for a load, comprising a load having two terminals;

voltage means for providing a full wave rectified voltage;

switching means having a firing electrode and a main current path connected between said voltage means and one terminal of said load;

trigger means connected across said voltage means and to the firing electrode of said switching means for controlling the conductive condition of said switching means;

current sensing means connected to said trigger means and coupled to the other terminal of said load for sensing the circuit through said load for switching said switching means to its conductive condition via said trigger means upon sensing determined magnitudes of current in said load; and rapid action current variation limiting means coupled to one terminal of said load and connected between the other terminal of said load and said current sensing means for limiting the current temporarily at a determined time and monitoring the voltage across said load, said rapid action current variation limiting means transferring current control of said load to said switching means via said current sensing means and said trigger means at a determined time so that a constant current is supplied to said load via said switching means regardless of variations in magnitude and frequency of the voltage provided by said voltage means and regardless of the operating condition of said load, said trigger means firing said switching means earlier in each cycle when the current in said load decreases and later in each cycle when the current in said load increases.

2. A ballast circuit for a gas discharge lamp, comprising a gas discharge lamp having two terminals;

a source of electrical energy having an output for providing a full wave rectified voltage at said output;

voltage doubler means connected to the output of said source for initially building up sufficient voltage to cause said lamp to strike;

semiconductor controlled rectifier means having a firing electrode and an anode-cathode path connected between said voltage doubler means and said source and one terminal of said lamp;

unijunction transistor trigger means connected across said source and having an output connected to the firing electrode of said semiconductor controlled rectifier means for controlling the conductive condition of said semiconductor controlled rectifier means;

current sensing means connected to said trigger means and having an output coupled to the other terminal of said lamp for sensing the current through said lamp and for initially switching said semiconductor controlled rectifier means to its conductive condition via said trigger means thereby applying the high voltage produced by the voltage doubler across said lamp and for later switching said semiconductor controlled rectifier means to its conductive condition via said trigger means upon sensing determined magnitudes of current in said lamp;

DC filter means connected to said one terminal of said lamp and coupled to said other terminal of said lamp;

high voltage sensing means connected across said DC filter means;

transient current block and ripple filter means coupled to said one terminal of said lamp via said high voltage sensing means and connected between said other terminal of said lamp and each of said DC filter means, said voltage doubler means and said current sensing means for rapid action current variation limiting and for limiting the current temporarily immediately after striking of said lamp and for monitoring the voltage across said lamp, said transient current block and ripple filter means transferring current control of said lamp to said semiconductor controlled rectifier means via said current sensing means and said trigger means after striking of said lamp so that a constant current is supplied to said lamp via said semiconductor controlled rectifier means regardless of the magnitude and frequency of the voltage provided by said source of electrical energy and regardless of the operating condition of said lamp, said trigger means firing said semiconductor controlled rectifier means earlier in each cycle when the current in said lamp decreases and later in each cycle when the current in said lamp increases; and blocking diode means connected between said voltage doubler means and said unijunction transistor trigger means for preventing feedback to said trigger means from said voltage doubler means thereby maintaining current regulation by said trigger means by insuring a zero voltage level in each cycle of operation.

References Cited

UNITED STATES PATENTS

| | | | |
|---|---|---|---|
| 3,344,310 | 9/1967 | Nuckolls | 315—194 X |
| 3,405,345 | 10/1968 | Someda et al. | 315—100 |

JAMES D. KALLAM, Primary Examiner

R. F. POLISSACK, Assistant Examiner

U.S. Cl. X.R.

315—199, 200, 238, 240, 241, 291, 307